United States Patent
Younger

(10) Patent No.: US 6,913,554 B2
(45) Date of Patent: Jul. 5, 2005

(54) METHODS AND SYSTEMS FOR IMPROVING THE OPERATION OF TRANSMISSIONS FOR MOTOR VEHICLES

(76) Inventor: Gilbert W. Younger, 2621 Merced Ave., El Monte, CA (US) 91733

( * ) Notice: Subject to any disclaimer, the term of this patent is extended or adjusted under 35 U.S.C. 154(b) by 0 days.

(21) Appl. No.: 10/678,924

(22) Filed: Oct. 3, 2003

(65) Prior Publication Data

US 2005/0075207 A1 Apr. 7, 2005

(51) Int. Cl.[7] .............................................. F16H 61/26
(52) U.S. Cl. ....................................... 475/127; 475/128
(58) Field of Search ................................ 475/116, 127, 475/128

(56) References Cited

U.S. PATENT DOCUMENTS 6,155,396 A * 12/2000 Tsubata et al. ........... 192/85 R
6,179,107 B1 * 1/2001 Hall, III ................... 192/109 F
6,471,613 B1 * 10/2002 Botosan et al. ............ 475/127
6,729,989 B2 * 5/2004 Younger ..................... 475/129

\* cited by examiner

Primary Examiner—Sherry Estremsky
(74) Attorney, Agent, or Firm—Mark P. Stone

(57) ABSTRACT

The present invention is directed to methods and systems for improving the operation of transmissions for automotive vehicles, and in particular the "factory installed" automotive transmissions installed by the original automobile manufacturer. The methods and systems in accordance with the present invention modify both the structural components and the hydraulic circuitry of the original automotive transmissions to enhance the operation of the modified transmissions. The improvements to the operation of the "factory installed" transmissions, and in particular the Allison transmission, include modification of the flow control valve to increase line pressure during lockup; modifications to the rotating clutch module to increase the torque held by the clutch and prevent clutch slippage, and modifications to the trim valves to adjust the pressure applied to the clutches for more efficient operation of the transmission.

16 Claims, 5 Drawing Sheets

METHODS AND SYSTEMS FOR IMPROVING THE OPERATION OF TRANSMISSIONS FOR MOTOR VEHICLES

BACKGROUND OF THE INVENTION

The methods and systems of the present invention are directed to the modification and improvement of transmissions for automotive vehicles, more commonly referred to as "factory installed" transmissions, installed in an automotive vehicle by an original motor vehicle manufacturer. The invention is more particularly directed to improvements to the "factory installed" transmission identified as the ALLISON TRANSMISSION (Series 1000/2000/2400) installed in vehicles manufactured by General Motors Corporation of Detroit, Mich.

The present inventor owns the following United States patents, the disclosures of which are expressly incorporated by reference into the present application: U.S. Pat. No. 4,449,426, issued May 26, 1984; U.S. Pat. No. 4,711,140, issued Dec. 8, 1987; U.S. Pat. No. 4,790,938, issued Dec. 13, 1988; U.S. Pat. No. 5,253,549, issued Oct. 19, 1993; U.S. Pat. No. 5,540,628, issued Jul. 30, 1996; U.S. Pat. No. 5,624,342, issued Apr. 29, 1997; U.S. Pat. No. 5,730,685, issued Mar. 24, 1998; U.S. Pat. No. 5,743,823, issued Apr. 28, 1998; U.S. Pat. No. 5,768,953, issued Jun. 23, 1998; U.S. Pat. No. 5,820,507, issued Oct. 7, 1998; U.S. Pat. No. 5,967,928, issued Oct. 19, 1999; U.S. Pat. No. 6,099,429, issued Aug. 8, 2000; U.S. Pat. No. 6,117,047, issued Sep. 12, 2000; U.S. Pat. No. 6,287,231, issued Sep. 11, 2001; U.S. Pat. No. 6,390,944, issued May 21, 2002; and U.S. Pat. No. 6,565,472, issued May 20, 2003.

Applicant also owns the following pending patent applications, the disclosures of each being expressly incorporated by reference into the present application: Ser. No. 10/348,846, filed Jan. 22, 2003; Ser. No. 10/360,576, filed Feb. 7, 2003; Ser. No. 10/081,605, filed Feb. 21, 2002; and Ser. No. 10/105,674, filed Mar. 25, 2002.

A publication entitled "Allison Transmission, Principles of Operation—1000/2000/2400 Series, On-Highway Transmissions, published by General Motors Corporation, Copyright 1999, discloses the "factory installed" Allison automotive transmission. This publication is expressly incorporated by reference, in its entirety, into the disclosure of the present application, as disclosing the components and operation of the "factory installed" Allison automotive transmission.

It is the primary object of the present invention to modify the "factory installed" ALLISON TRANSMISSION to improve the overall operation and efficiency of this factory installed automotive transmission. The modifications to the "factory installed" transmission, as more fully described herein, include modifications to both structural components and hydraulic circuitry resulting in increased line pressure during lockup, increased pressure applied to the clutches to increase the torque held by the clutches thereby reducing clutch slippage, and modification to the A and B trim valves to increase or otherwise adjust pressure applied to the clutches.

Other objects and advantages of the modifications to the "factory installed" automotive transmission in accordance with the present invention will become apparent from the following description in conjunction with the drawings.

SUMMARY OF THE INVENTION

Methods, apparatus and systems are provided for modifying the structure, operation and functional relationship of structure in the hydraulic circuitry of "factory installed" transmissions for automotive vehicles, and in particular the automotive transmission known as the ALLISON TRANSMISSION 1000/2000/2400 Series, installed in vehicles manufactured by General Motors Corporation of Detroit, Mich.

In the "factory installed" ALLISON TRANSMISSION, line pressure is limited to 150 pounds per square inch (psi) when the flow control valve is in a lockup position. In accordance with a first aspect of the present invention, the structure of the "factory installed" flow control valve, and the flow of fluid through the valve, are modified so as to increase line pressure to a value between 150 psi–236 psi, at the selection of the automotive mechanic, when the flow control valve is in lockup position.

In the "factory installed" ALLISON TRANSMISSION, the C2 clutch, which is intended to hold engine torque when the automotive transmission is in fourth or fifth gear, tends to slip, resulting in loss of the ability of the "factory installed" transmission to hold engine torque in fourth and fifth gears. In a further aspect of the present invention, modifications made to the C2 clutch increase the ability of the transmission to hold engine torque in fourth and fifth gears by, among other things, increasing the surface area for the application of clamping force by the C2 clutch, and adjusting the hydraulic fluid flow in the C2 clutch pack during the application of the clutch to prevent the clutch from being applied too abruptly. These modifications increase the clamping force of the C2 clutch as it is applied, thereby reducing slippage and significantly increasing the ability of the clutch to hold engine torque when the transmission is in fourth and fifth gear.

In the "factory installed" ALLISON TRANSMISSION, the A trim solenoid and valve regulates the C1 clutch pack for shifting the transmission into and out of first gear, and regulates the C3 clutch pack for shifting the transmission into and out of third and fifth gears. The A Trim solenoid and valve of the "factory installed" ALLISON TRANSMISSION limits the fluid pressure applied to the A Trim valve to a maximum of between 127–130 psi. In a further aspect of the present invention, the structure of the "factory installed" A Trim valve, and the flow of fluid therethrough, is modified so that the pressure applied to the A Trim valve is increased, at the selection of the mechanic, from 127 psi to 236 psi (corresponding to maximum line pressure), or any value therebetween. The increase in pressure applied to the A Trim Valve significantly increases the capacity of the automotive transmission to hold engine torque in first, third and fifth gear positions of the transmission.

In the "factory installed" ALLISON TRANSMISSION, the B trim solenoid and valve regulates the C4 clutch pack for shifting the transmission into and out of second gear, and also regulates the C1 clutch pack for shifting the transmission into and out of fourth and fifth gears. The B Trim solenoid and valve of the "factory installed" ALLISON TRANSMISSION limits the fluid pressure applied to the B Trim valve to a maximum of between 127–130 psi. In a further aspect of the present invention, the structure of the "factory installed" B Trim valve, and the flow of fluid therethrough, is modified so that the pressure applied to the B Trim valve is increased, at the selection of the mechanic, from 127 psi to 236 psi (corresponding to maximum line pressure), or any value therebetween. The increase in pressure applied to the B Trim valve significantly increases the capacity of the automotive transmission to hold engine torque in second, fourth and fifth gear positions of the transmission.

The modifications in accordance with the present invention to both the structural components and the hydraulic circuitry of the "factory installed" ALLISON TRANSMISSION improves the overall efficiency and operation of the "factory installed" transmission by overcoming known disadvantages experienced with the "factory installed" transmission. Additional modifications to the structure and hydraulic circuitry of the "factory installed" ALLISON TRANSMISSION in accordance with the present invention to further improve the operation of the "factory installed" transmission will become apparent to those skilled in the automotive transmission art from the following discussion in conjunction with the accompanying drawings.

DESCRIPTION OF THE BEST MODES FOR CARRYING OUT THE INVENTION

The present invention is directed to modifications of the structural components and hydraulic circuitry of a "factory installed" Allison automotive transmission to improve its overall operation and efficiency. The structure, hydraulic circuitry, and operation of the "factory installed" Allison automotive transmission, 1000/2000/2400. Series, is known to persons skilled in the automotive transmission art. The structural components, hydraulic circuitry, and operation of the Allison automotive transmission, 1000/2000/2400 Series, is fully disclosed in a publication entitled *Allison Transmission, Principles of operation,* 1000/2000/2400 *Series, On-Highway Transmissions*, published by General Motors Corporation, Copyright 1999, the disclosure of said publication being expressly incorporated by reference, in its entirety, into the present patent specification.

Figure 1:
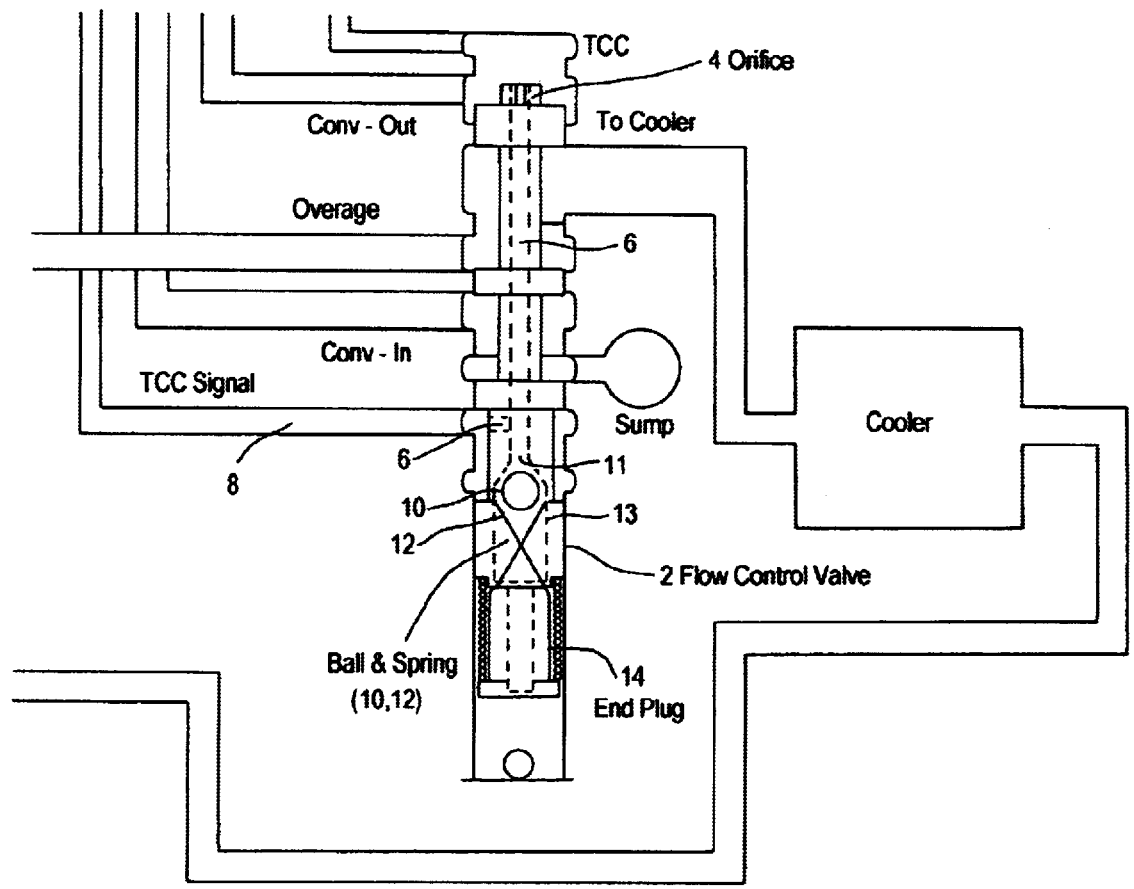
FIG. 1 illustrates a flow control valve and related hydraulic circuitry of an Allison automotive transmission, modified in accordance with the present invention.

FIG. 1 of the drawing illustrates a portion of the hydraulic system of a "factory installed" Allison automotive transmission, modified in accordance with a first aspect of the present invention. A flow control valve, generally designated by reference numeral 2, is shown stroked down in a lockup position. In the "factory installed" transmission, when the flow control valve is in its lockup position, TCC (torque converter control) oil flows into an orifice, designated by reference numeral 4, and through a fluid channel or passageway, designated by reference numeral 6, defined within the flow control valve. Fluid flowing through the channel 6 exits the flow control valve and enters a TCC signal circuit, designated by reference numeral 8. The inlet end of circuit 8 intersects, and is in fluid communication with, an outlet of the channel 6. The fluid flowing through the TCC signal circuit 8 is applied to the second land of a pressure regulator valve (not shown in FIG. 1) to reduce line pressure. In the "factory installed" ALLISON TRANSMISSION, when the flow control valve is in its lockup position, line pressure is limited to a maximum of 150 pounds per square inch (psi).

In accordance with a first aspect of the present invention, the flow control valve 2 is modified to adjust the quantity of fluid flowing into the TCC signal circuit 8 from the channel 6. By reducing fluid flow into the TCC signal circuit 8, the fluid pressure applied to the second land of the pressure regulator valve is also reduced, thereby increasing maximum line pressure when the flow control valve is in its lockup position. The channel 6 in the flow control valve 2 as modified in accordance with the present invention includes an opened bottom end (as viewed in FIG. 1) designated by reference numeral 11. The bottom portion of the channel 6 merges into a wider channel designated by reference numeral 13. A check ball 10 received in the channel 13 is urged against the opened bottom end 11 of the channel 6 by a spring 12 which exerts a resilient force on the ball 10 in the direction of the channel 6. The diameter of the ball 10 is greater than the diameter of the channel 6 so that the ball 10 cannot enter the channel 6. An end plug 14, in fluid communication with the channel 13, includes an exhaust.

In operation, fluid pressure is exerted against the top of the ball 10 (as viewed in FIG. 1) by fluid introduced into the orifice 4 and flowing through the channel 6. The ball 10 remains seated on the opened bottom end 11 of the channel 6 to seal the bottom end of the channel 6 as long as the resilient force of the spring 12 exerted against the ball 10, which opposes the pressure of the fluid in channel 6 exerted on the ball 10, exceeds the fluid pressure applied to the ball through channel 6. When the bottom end 11 of the channel 6 is sealed, the fluid pressure in the channel 6 is applied to the pressure regulator valve through the TCC signal circuit 8 which is in fluid communication with the channel 6. However, once the fluid pressure in the channel 6 increases to a threshold value exceeding the opposed resilient force applied by the spring 12 to the check ball 10, the check ball 10 is displaced from the bottom end 11 of the channel 6 in a downward direction (as viewed in FIG. 1), thereby permitting a portion of the fluid flowing through the channel 6 to flow around the check ball 10 and not flow through the signal circuit 8. Therefore, the maximum fluid pressure applied to the pressure regulator valve through the signal circuit 8 is limited to the value of the fluid pressure necessary to unseat the check ball 10 from the opened bottom end 11 of the channel 6. This threshold pressure can be adjusted, at the selection of the user, by adjusting the resilient force applied to the check ball 10 by the spring 12. Such adjustment can be accomplished by replacing the spring 12 with another spring 12 having a different spring characteristic. The excess fluid flowing around the check ball 10 and through the wider channel 13 after the check ball has been displaced from the opened bottom end 11 of the channel 6, is exhausted from the flow control valve 2 by the end plug 14, located downstream from the check ball 10, which includes an exhaust port.

In summary, by reducing the quantity of fluid flowing into the circuit 8 from the channel 6 as a result of the check ball and spring combination, the fluid pressure applied to the second land of the pressure regulator valve is also reduced, thereby increasing maximum overall line pressure of the hydraulic circuit. In accordance with the preferred embodiments of the present invention, modification of the flow control valve 2 enables a mechanic to selectively adjust maximum line pressure from between 150 psi (the maximum line pressure of the factory installed transmission) and 236 psi (the increased maximum line pressure resulting from the modifications to the flow control valve 2), and any value therebetween. The degree to which the maximum line pressure is increased corresponds to the resilient force applied to the check ball by the spring, and is therefore selectively variable by adjusting the spring characteristic of the spring 12.

Figure 2:
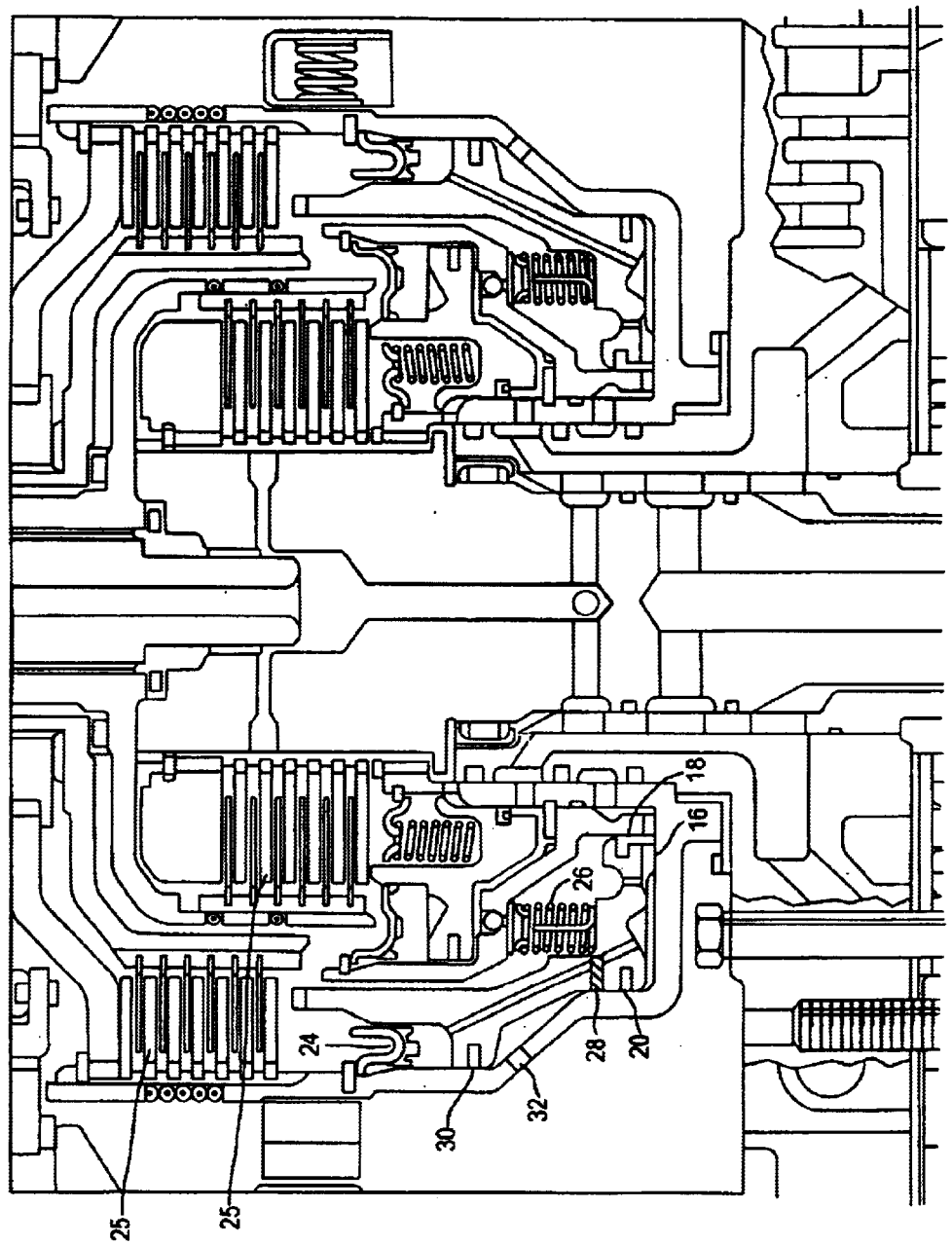
FIG. 2 illustrates a C2 clutch pack of an Allison automotive transmission, modified in accordance with the present invention.

FIG. 2 illustrates a further aspect of improvements to the "factory installed" ALLISON TRANSMISSION in accordance with the present invention. The "factory installed" ALLISON TRANSMISSION contains a rotating clutch module having a C1 clutch pack and a C2 clutch pack. The C2 clutch pack carries the engine torque when the transmission is in fourth and fifth gears. The C2 clutch pack has proven to be the weakest link in the "factory installed" ALLISON TRANSMISSION in that it tends to slip when the vehicle in which the "factory installed" ALLISON TRANSMISSION is towing loads, or if any power is added to the engine. In accordance with the present invention, the "factory installed" ALLISON TRANSMISSION is further modified to eliminate this slippage problem. These modifications are illustrated by FIG. 2 of the drawing, which will now be discussed as follows.

The apply piston for the C2 clutch in the "factory installed" transmission is illustrated by reference numeral 16. In the "factory installed" transmission, the apply piston 16 is applied with a pressure of approximately 235 psi on an area of 20 squares inches. This area is defined between the seals 18 and 20 illustrated in FIG. 2. Oil is also forced upwardly, as viewed in FIG. 2, through two openings in a piston designated by reference numeral 22, to a chamber defined on the other side of the apply piston which is sealed by a piston/seal assembly designated by reference numeral 24. The pressure established in this region generates a force which opposes the apply force of the C2 clutch apply piston 16. The pressure opposing the apply force of the C2 clutch apply piston is itself applied in an area of 8.8 square inches. Therefore, the apply area of the C2 clutch piston in the "factory installed" transmission is reduced by an amount of 8.8 square inches, resulting in a net apply area of 11.2 square inches (20 square inches minus 8.8 square inches). Since the apply piston is applied at a pressure of 235 psi in the "factory installed" transmission, the resultant clamping force is 2,632 lbs. (235 psi multiplied by 11.2 square inches). In the "factory installed" transmission, thirty-two return springs designated by reference numeral 25 in the drawing, each weighing 5 lbs., 8 oz., oppose the apply piston 16 for the C2 clutch, thereby reducing the total clamping force by an additional 176 lbs. (32 multiplied by 5 lbs., 8 oz.) resulting in a net clamping force by the apply piston for the C2 clutch of 2,456 lbs. (2,632 lbs. minus 176 lbs.). The modifications made to the "factory installed" transmission in accordance with the present invention increase the clamping force of the apply piston for the C2 clutch to increase the operating efficiency of the clutch to prevent slippage of the C2 clutch in 4th and 5th gears when towing loads or when adding power to the engine.

The first modification made to the "factory installed" transmission to improve the efficiency of the C2 apply piston is accomplished by drilling an opening of 0.040 inches in diameter through the piston 22 in the area designated by reference numeral 28. The opening provided at reference numeral 28 charges the chamber defined between the seal 20 and a seal designated by reference numeral 30. In the "factory installed" transmission, the chamber defined between seals 20 and 30 was vented by a hole designated by reference numeral 32 defined in an outer drum designated by reference numeral 34. In accordance with further modifications of the present invention, the vent opening 32, which has a diameter of 0.200 inches in the "factory installed" transmission, is reduced to a diameter of 0.017 inches. Therefore, when the piston is applied, the chamber defined between seals 18 and 20 is quickly charged through a 0.137 opening in a valve body plate of the "factory installed" transmission.

The apply piston 16 is caused to move upwardly, as viewed in FIG. 2, by fluid (oil) applied to the piston between the seals 18 and 20. As the apply piston continues to move, the chamber defined between seals 20 and 30 is sealed, thereby essentially creating a vacuum. This vacuum remains substantially unaffected by the opening designated by reference numeral 28 because the size of the opening is too small to affect the vacuum created in the chamber defined between seals 28 and 30. As a result, air is drawn into the chamber defined between seals 20 and 30 by the opening designated by reference numeral 32. As a result, the air within the inner chamber defined between seals 18 and 20 must flow into the outer chamber defined between seals 20 and 30 through opening 28 to force air out through the reduced diameter opening 32 before any significant pressure is applied to the apply piston 16.

In summary, the upwardly moving apply piston 16 expands the area in the outer chamber defined between seals 20 and 30. Simultaneously, fluid is compressed from the inner chamber defined between seals 18 and 20 and into the outer chamber defined between seals 20 and 30 through the opening 28 connecting the inner and outer chambers, as a result of the upwardly moving apply piston. The size of opening 28 is selected to be sufficiently small so that the fluid flow from the inner chamber and into the outer chamber is delayed as the apply piston continues to move. Simultaneously, air is being drawn into the outer chamber (defined between seals 20 and 30) through the reduced diameter opening 32, thereby further impeding the flow of fluid from the inner chamber into the outer chamber. This interaction between fluid pressure and fluid flow between the inner and outer chambers prevents abrupt application of the C2 clutch by the apply piston 16, and utilizes maximum apply surface area.

In addition to the modifications to the "factory installed" transmission discussed above, two 0.055 inch diameter orifices are installed in the top of passages that feed the chamber defined under the seal/piston assembly designated by reference numeral 24. The original openings are 0.10 inches in diameter. The reduction in diameter of these openings causes the fluid leaving this chamber as a result of movement of the apply piston for the C2 clutch to intensify against the reduced diameter openings, thereby further delaying the application of the C2 apply piston, and reducing abrupt apply of the C2 clutch during a 3–4 upshift.

As a result of the aforementioned modifications to the "factory installed" transmission, abrupt application of the apply piston for the C2 clutch is prevented, and the apply area is significantly increased. The apply area of the C2 clutch piston, as a result of the modifications made to the "factory installed" transmission, is now measured from seal 18 out to seal 30 for a total of 35 square inches. The opposition piston area of 8.8 square inches, when deducted from 35 square inches, results in an apply area of 26.2 square inches, resulting in a clamping force of 6,183 lbs. (236 psi multiplied by 26.2 square inches). Subtracting 176 lbs., representing the weight of the thirty-two piston return springs, results in a net clamping force for the C2 clutch piston of 6007 lbs., an increase of nearly 2.5 times of that of the clamping force of the C2 clutch apply piston realized by the "factory installed" transmission. As a result of the significant increase in the clamping force of the apply piston, slippage of the C2 clutch when the vehicle is towing loads, or when engine power of the vehicle is increased, is significantly reduced or eliminated.

An additional gain to the C2 clutch piston clamping force can be realized by plugging two 0.110 inch diameter openings in the "factory installed" transmission which feed fluid to the opposing piston 22. Plugging these openings effectively disables the opposing piston, thereby adding a surface area of 8.8 square inches to the C2 apply piston. In the alternative, the opposing piston 22 of the "factory installed" transmission can be removed in its entirety, which will also add 8.8 square inches to the surface area of the C2 apply piston. Increasing the apply area of the C2 apply piston increases the clamping force of the C2 clutch, as more fully discussed above. When the "factory installed" transmission is modified to disable or remove the opposing piston 22, the force of the return springs should be increased to prevent application of the apply piston and dragging of the C2 clutch in first, second and third gear when in an exhaust mode. This is accomplished by adding additional return springs, which are designated by reference numeral 26 in FIG. 2.

The modifications to the "factory installed" transmission, as discussed with respect to FIG. 2 of the drawing, improve the efficiency of the transmission by both reducing the abruptness at which the C2 clutch is applied by the apply piston, and by increasing the apply area of the C2 clutch, thereby reducing or eliminating slippage of the C2 clutch pack of the "factory installed" transmission.

Figure 3:
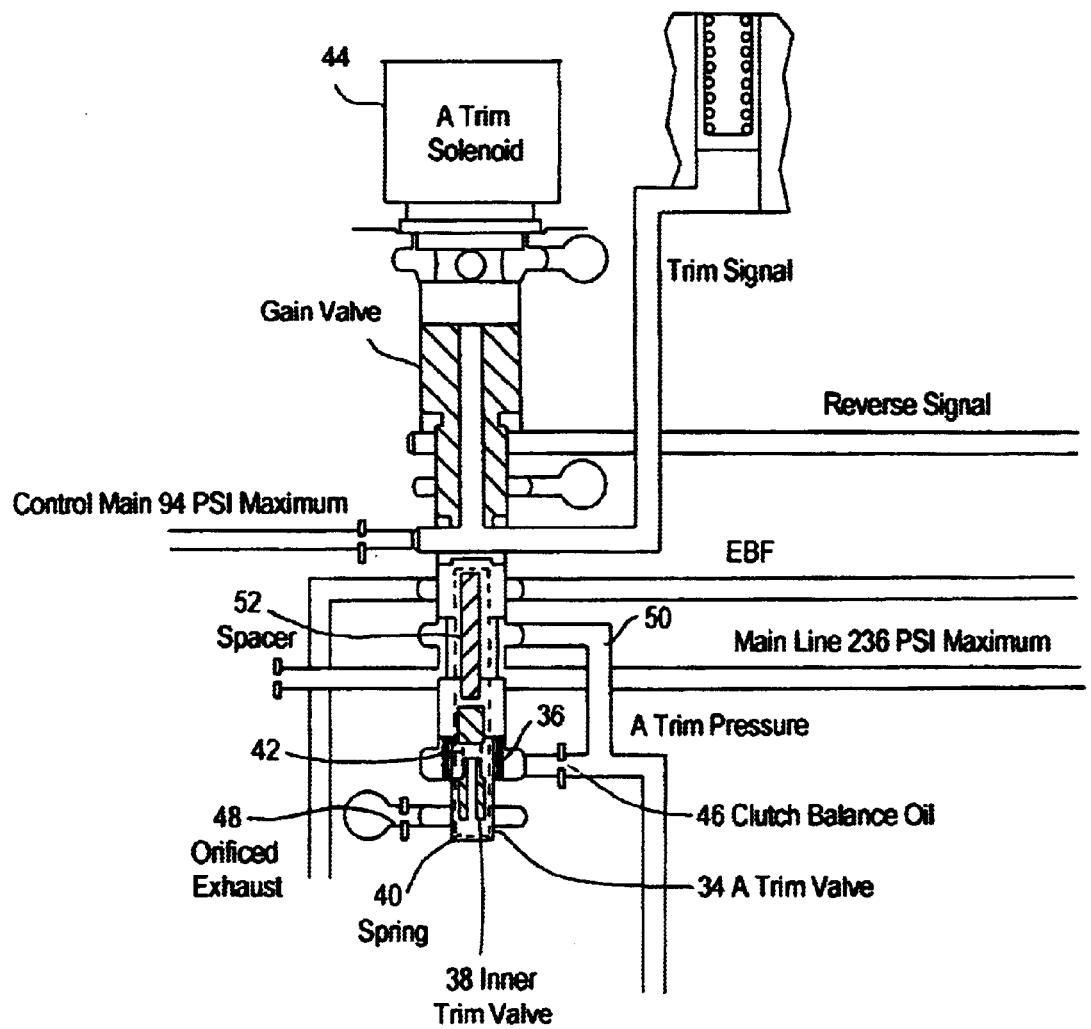
FIG. 3 illustrates a A Trim Valve and related structural components and hydraulic circuitry of an Allison automotive transmission, modified in accordance with the present invention.

FIG. 3 of the drawing illustrates further modifications to the "factory installed" ALLISON TRANSMISSION in accordance with further aspects of the present invention. A "factory installed" transmission includes an A trim solenoid and valve which is used by the transmission control module to regulate the C1 clutch pack for smooth shifting into and out of first gear, and to regulate the C3 clutch pack for smooth shifting into and out of third and fifth gears. In the "factory installed" transmission, the maximum feed pressure applied to the A trim solenoid is 94 psi, but it has been discovered that in practice, this solenoid can tolerate a maximum feed pressure of only 82 psi. Any feed pressure applied to the solenoid in excess of 82 psi tends to leak past the solenoid seat. When the "factory installed" A solenoid is closed, apply pressure acts on the left end of an A trim valve to regulate incoming clutch pressure, ranging from a starting pressure of 0 psi to a maximum pressure of 129 psi. With a maximum solenoid feed pressure of 94 psi acting on the left end of the A trim valve which has a diameter of 0.432 inches, the total available surface area available for moving the valve in a rightward direction is 0.1465 square inches, resulting in a total force of 12.03 lbs. (82 psi multiplied by 0.1465 square inches) applied to the left end of the A trim valve to move the valve in a rightward direction. A spring provided to act on the right end of the A trim valve in the "factory installed" transmission applies an opposing force to the rightward movement of the valve of 2.250 lbs., resulting in a net force of 9.73 lbs. applied to the left end of the A trim valve to move it in a rightward direction. Oncoming clutch pressure acts on the area of the valve differential (the difference between the diameters of the lands of the valve) on the right end of the A trim valve which has a surface area of 0.75 square inches. When the force applied to the right end of the A trim valve equals 9.73 lbs., the clutch pressure can go no higher, and the A trim valve will move leftward and close the feed of clutch pressure. Therefore, in the "factory installed" transmission, the clutch feed pressure acting on the A trim valve cannot exceed 130.17 psi (representing a pressure of 9.73 lbs. divided by 0.075 square inches of surface area).

FIG. 3 of the drawing illustrates modifications made to the "factory installed" A trim solenoid and valve, in accordance with the present invention. The "factory installed" A trim valve is replaced by a new trim valve, designated generally by reference numeral 34. The new trim valve 34 is hollow, and an opening designated by reference numeral 36 is cross-drilled into the new trim valve 34. An inner trim valve component, designated by reference numeral 38, is received within the hollow outer trim valve 34. A spring, designated by reference numeral 40, is provided to act on the right end of the inner trim valve 38, as illustrated by FIG. 3. An opening, designated by reference numeral 42, is cross-drilled into the inner trim valve 38.

Reference numeral 44 designates the A trim solenoid. As pressure is applied to the solenoid 44 to start applying the clutches, the solenoid acts on the inner trim valve 38, driving it in a rightward direction as viewed in FIG. 3. Simultaneously, fluid pressure is applied to outer valve 34 from passageway 46, moving the outer valve in a leftward direction as viewed in FIG. 3. As the inner trim valve 38 moves relative to the outer trim valve 34, the cross-drilled opening 42 in the inner trim valve 38 will, at some point, move into alignment with the cross-drilled opening 36 in the outer trim valve 34. Although movement of the inner valve 38 relative to the outer valve 34 to align the respective cross-drilled openings is controlled by the fluid pressure applied to the inner valve by the solenoid 44 and the fluid pressure applied to the outer valve through passageway 46, the position at which alignment of the openings occurs can be adjusted or varied by the spring 40. As the inner trim valve 38 is moved relative to the outer trim valve 34, the right end of the inner trim valve compresses the spring 40 acting on the right end of the inner trim valve. The spring applies a force to the inner trim valve opposing movement of the inner valve in a rightward direction as shown by FIG. 3. Therefore, the opposing force of the spring 40 adjusts the effect of the fluid pressure of the solenoid 44 moving the inner valve 38 relative to the outer valve 34 (which is moving in the opposite direction as a result of fluid pressure applied from passageway 46) to adjust the position at which the respective cross-drilled openings 36 and 42 are moved into alignment with each other.

When the openings in the inner and outer valve components 38 and 34 are in alignment, clutch balance oil will flow from passageway 46, through the aligned openings in the outer and inner valves 34 and 38, through the hollow portion and opened end of the inner valve 38, and out through an exhaust 48 in fluid communication with the opened end of the inner valve. Thus, when the openings in the inner and outer valve components are in alignment, there is a direct fluid path from passageway 46 to the exhaust 48. The exhaust valve 48, in the modified transmission, has an enlarged diameter of 0.110 inches (the diameter of this exhaust valve in the "factory installed" transmission is 0.040 inches). By exhausting clutch balance oil from passageway 46, the clutch balance oil is not applied to the outer valve 34, which no longer moves in a leftward direction as viewed in FIG. 3. Therefore, the outer valve 34 will not move into a position to block or cut off fluid pressure applied through passageway 50 which is a branch of passageway 46. As a result, the fluid pressure through line 50, which is the clutch apply pressure, can increase above that of the maximum clutch apply pressure of the "factory installed" transmission. The openings in the inner and outer valve components, and the resilient force and fluid pressures applied to the inner and outer valves, must be arranged such that the openings in the inner and outer valves move into alignment, and fluid from passageway 46 is exhausted through the exhaust 48, before the outer valve is moved a sufficient distance in which it blocks or cuts off fluid flow (clutch pressure) from passageway 50. As a result of this arrangement, the apply clutch pressure generated by the A trim system exceeds the maximum clutch pressure of 129 psi of the factory installed transmission, and can be increased to a maximum clutch pressure equivalent to the maximum main line pressure of 236 psi. Therefore, the maximum apply clutch pressure of the modified A Trim system can be selectively adjusted between a range of 129 psi (the maximum apply pressure permitted by the factory installed transmission) to 236 psi (maximum main line pressure produced by the transmission), and any value therebetween.

In addition to adjusting the maximum apply pressure of the solenoid to the trim valve by adjusting the characteristic of the spring 40, adjustments may also be accomplished by varying the size of a spacer element 52 positioned towards the left end of the inner trim valve, as shown by FIG. 3. The length of the spacer element 52 effects the distance which the inner trim valve 38 must move relative to the outer trim valve 34 to align the cross drilled openings in the inner and outer valves to increase the clutch pressure as described above.

As a result of the modifications to the factory installed transmission as illustrated and discussed with respect to FIG. 3, the maximum clutch pressure can be adjusted, at the selection of the user, to be equivalent to main line pressure. This results in a nearly 80% increase of the maximum clutch pressure provided by the factory installed transmission, thereby increasing the capacity of the transmission to hold torque during increase in engine power and when towing loads on all clutch packs fed through the A trim system which includes the C5 clutch pack (first gear), the C3 clutch pack (third gear) and the C3 clutch pack (fifth gear). The increase in maximum clutch pressure significantly reduces or eliminates slippage of the C3 and C5 clutches, thereby increasing the overall efficiency of the transmission.

Figure 4:
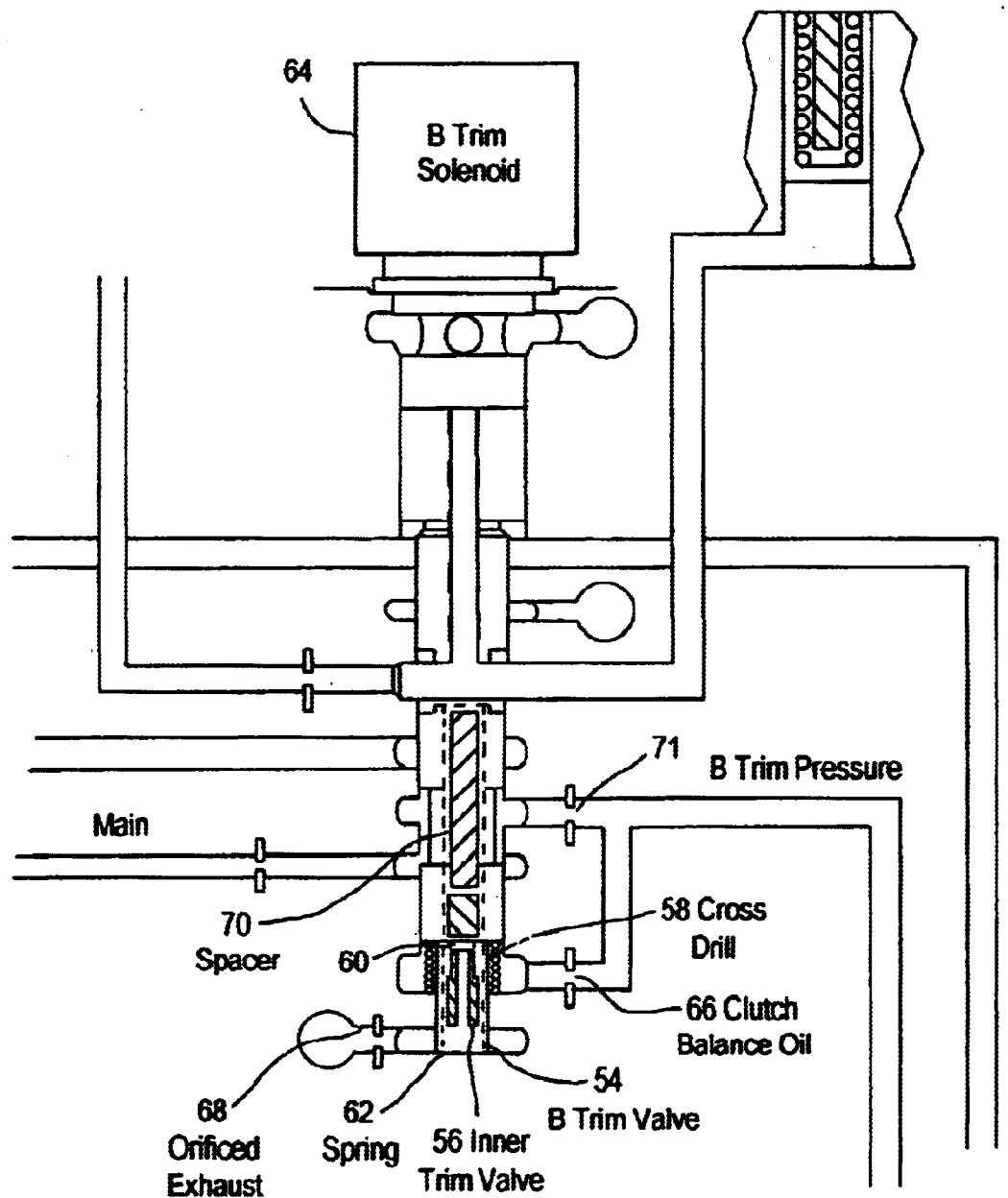
FIG. 4 illustrates a B Trim Valve and related structural components and hydraulic circuitry of an Allison automotive transmission, modified in accordance with the present invention.

FIG. 4 of the drawing illustrates a further improvement of the factory installed Allison automotive transmission in accordance with the present invention. The B trim solenoid and valve of the factory installed transmission is used by the transmission control module to regulate the C4 clutch pack for smooth shifts into and out of second gear. The B trim solenoid and valve is also used to regulate the C1 clutch pack during shifts down from line in fourth gear, to exhaust the C1 clutch pack during a 4th–5th upshift of the transmission, and to re-apply the C1 clutch pack during a 5th–4th gear coast and during kickdown shifts. In the factory installed transmission, a maximum fluid pressure of 94 psi is applied to the B solenoid when the solenoid is closed. The apply pressure acts on the left end of the B trim valve (as shown by FIG. 4) to regulate incoming applied clutch pressure between a range of 0 psi to a maximum of 129 psi. With a maximum of 94 psi applied to the B solenoid and acting on the left end of the B trim valve (as shown by FIG. 4), the total surface area of the left end of the valve is 0.1576 square inches (the diameter of the left end of the valve is 0.448 inches), resulting in a total rightward force of 14.8 pounds (representing 94 psi multiplied by 0.1576 square inches) acting on the left end of the B trim valve. A spring acting on the right end of the B trim valve applies an opposing force of 2.25 lbs. resulting in a net force of 12.55 pounds applied to the left end of the B trim valve in the direction shown by FIG. 4. Oncoming clutch pressure acts on the area of the differential (the difference between the diameters of the lands of the B trim valve) on the right end of the B trim valve having a surface area of 0.097 square inches. When the force applied to the right end of the B trim valve equals 12.55 pounds, the clutch pressure can go no higher, and the B trim valve will move in a leftward direction as shown in FIG. 4 and close the clutch feed. As a result of this arrangement in the factory installed transmission, there can be no clutch feed through the B trim valve exceeding 129 psi (representing the force of 12.55 lbs. divided by the surface area of 0.097 square inches).

The B trim system of the factory installed ALLISON TRANSMISSION has been modified in accordance with the present invention as illustrated by FIG. 4 of the drawing. The factory installed B trim valve has been replaced by a new B trim valve comprising a hollow outer valve component designated by reference numeral 54 and an inner trim valve component designated by reference numeral 56. The inner valve component 56 is received within the hollow valve component 54. A cross-drilled opening is made in the outer valve component 54 at the position designed by reference numeral 58, and a cross-drilled opening is made in the inner valve component 56 at the position designated by reference numeral 60. A spring designated by reference numeral 62 applies a force on the right end of the inner valve component 56 in the direction illustrated by FIG. 4. As the B trim solenoid 64 is actuated to start applying the clutches, the solenoid exerts a force on the left side of the inner valve component 56, in the direction illustrated by FIG. 4. The force exerted by the solenoid on valve component 56 causes the valve component to move in a rightward direction, as illustrated by FIG. 4, against the opposing force applied by the spring 62 to the right end of the inner valve component 56. Simultaneously, fluid pressure is applied to the outer valve component 54 from passageway 66, moving the outer valve in a leftward direction as viewed in FIG. 4. As the inner trim valve 56 moves relative to the outer trim valve 54, the cross-drilled opening 60 in the inner valve component and the cross-drilled opening 58 in the outer valve component will, at some point, move into alignment with each other. Although movement of the inner valve 56 relative to the outer valve 54 to align the respective cross-drilled openings is controlled by the fluid pressure applied to the inner valve by the solenoid 64 and the fluid pressure applied to the outer valve through passageway 66, the position at which alignment of the openings occurs can be adjusted or varied by the spring 62. As the inner trim valve 56 is moved relative to the outer trim valve 54, the right end of the inner trim valve compresses the spring 62 acting on the right end of the inner trim valve. The spring applies a force to the inner trim valve opposing movement of the inner trim valve in a rightward direction as viewed in FIG. 4. Therefore, the opposing force of the spring 62 adjusts the effect of the fluid pressure of the solenoid 64 moving the inner valve 56 relative to the outer valve 54 (which is moving in the opposite direction as a result of fluid pressure applied from passageway 66) to adjust the position at which the respective cross-drilled openings 58 and 60 are moved into alignment with each other.

When the openings in the inner and outer valve components 56 and 54 are in alignment, clutch balance oil will flow from passageway 66, through the aligned openings in the inner and outer valves 56 and 54, through the hollow portion and opened end of the inner valve 56, and out through an exhaust 68 in fluid communication with the opened end of the inner valve. Thus, when the openings in the inner and outer valve components are in alignment, there is a direct fluid path from passageway 66 to the exhaust 68. The exhaust valve 68, in the modified transmission, has an enlarged diameter of 0.110 inches (the diameter of the exhaust valve in the "factory installed" transmission is 0.040 inches). By exhausting clutch balance oil from passageway 66, the clutch balance oil is not applied to the outer valve 54, which no longer moves in a leftward as viewed in FIG. 4. Therefore, the outer valve 54 will not move into a position to block or cut off fluid pressure applied through passageway 71 which is a branch of passageway 66. As a result, the fluid pressure through line 71, which is the clutch apply pressure, can increase above that of the maximum clutch apply pressure of the "factory installed" transmission. The openings in the inner and outer valve components, and the resilient force and fluid pressures applied to the inner and outer valves, must be arranged such that the openings in the inner and outer valve components move into alignment, and fluid from passageway 66 is exhausted through the exhaust 68, before the outer valve is moved a sufficient distance in which it blocks or cuts off fluid flow (clutch pressure) from passageway 71. As a result of this arrangement, the apply clutch pressure generated by the B Trim system exceeds the maximum clutch pressure of 129 psi of the "factory installed" transmission, and can be increased to a maximum clutch pressure equivalent to the maximum main line pressure of 236 psi. Therefore, the maximum apply clutch pressure of the modified B Trim system can be selectively adjusted between a range of 129 psi (the maximum apply pressure permitted by the "factory installed" transmission) to 236 psi (maximum main line pressure produced by the transmission), and any value therebetween.

In addition to adjusting the maximum apply pressure of the solenoid to the trim valve by adjusting the characteristic of the spring 62, adjustments may also be accomplished by varying the size of a spacer element 70 positioned towards the left end of the inner trim valve 56, as shown by FIG. 4. The length of the spacer element 70 effects the distance which the inner trim valve 56 must move relative to the outer trim valve 54 to align the cross drilled openings in the inner and outer valves to increase the clutch pressure as described above.

As a result of the modifications to the "factory installed" transmission as illustrated and discussed with respect to FIG. 4, the maximum clutch pressure can be adjusted, at the selection of the user, to the equivalent to mainline pressure. This results in a nearly 80% increase of the maximum clutch pressure provided by the "factory installed" transmission, thereby increasing the capacity of the transmission to hold torque during increase in engine power and when towing loads on all clutch packs fed through the B trim system. The increase in maximum clutch pressure significantly reduces or eliminates slippage of the clutches, thereby increasing the overall efficiency of the transmission.

Figure 5:
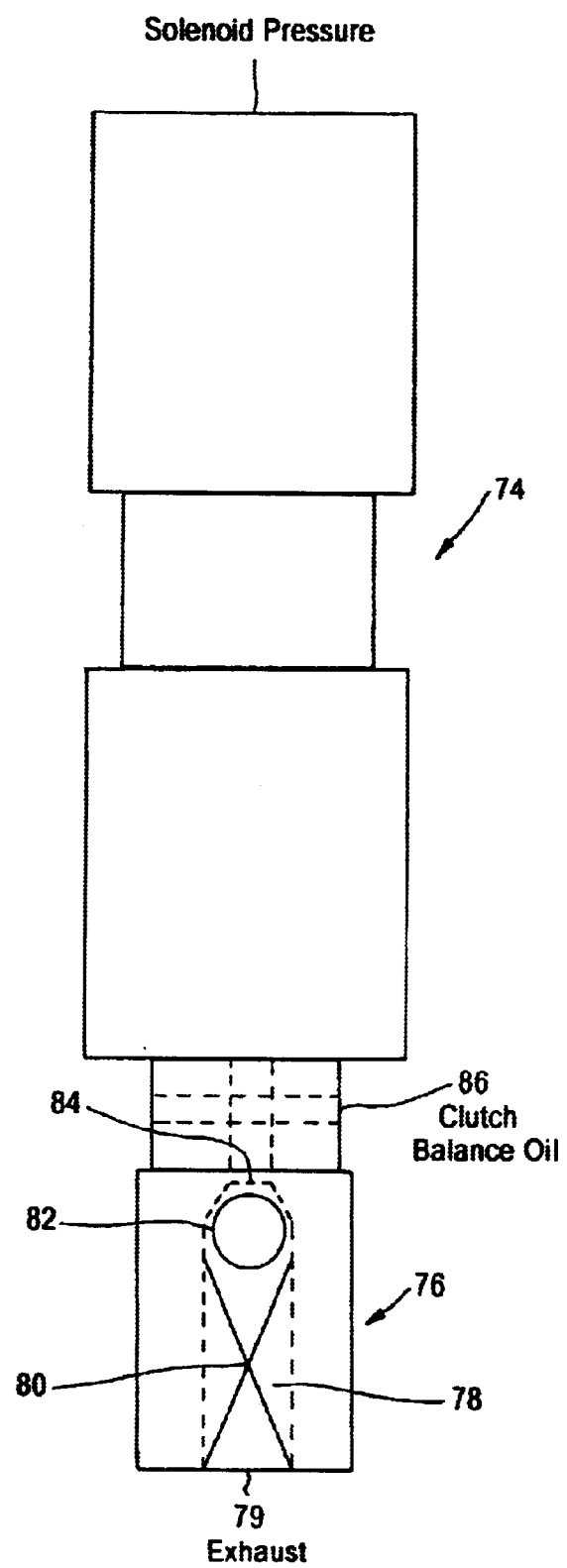
FIG. 5 illustrates a modification to the embodiments of the invention illustrated by FIGS. 3 and 4 of the drawings.

FIG. 5 illustrates a modification to the embodiments of the invention illustrated by FIGS. 3 & 4. In the FIGS. 3 and 4 embodiments of the invention, a spring acting on the right end of the inner trim valve component is provided to control or adjust the position at which the cross-drilled openings in the inner and outer valve components are moved into alignment with each other, causing clutch pressure to exhaust. In the FIG. 5 embodiment of the invention, the "factory installed" trim valve (either the A Trim or the B Trim) is replaced by a modified single trim valve designated generally by reference numeral 74. The modified valve 74 includes an end cap generally designated by reference numeral 76 at the right end of the valve, as viewed in FIG. 5. The end cap 76 includes a hollow portion designated by reference numeral 78, defining an opened right end 79 (as viewed in FIG. 5) which defines, or is in fluid communication with, an exhaust. A spring 80 and a check ball 82 are received within the hollow portion 78 of the end cap 76. The spring exerts a resilient force on the check ball to maintain the check ball seated on an inlet opening 84 defined at the left end of the end cap 76 as viewed in FIG. 5. The inlet opening 84 of the hollow portion 78 is in fluid communication with a passageway 86 which applies fluid pressure to move the valve 74 in a leftward direction as viewed by FIG. 5. As discussed with respect to the embodiments of the invention illustrated by FIGS. 3 and 4, when the clutch pressure applied to the trim valve of the "factory installed" transmission reaches a predetermined maximum, the valve has been moved into a position in which it blocks further feed of clutch pressure, thereby limiting the maximum clutch pressure for the A and B trim systems. In the FIG. 5 embodiment of the invention, the fluid pressure applied to the valve 74 through the passageway 86 is also applied to the check ball 82 through the inlet 84. The fluid pressure applied to the check ball 82 opposes the resilient force applied to the check ball by the spring 80. When the fluid pressure applied to the check ball does not exceed the resilient force of the spring applied to the check ball, the check ball remains seated over the inlet 84, sealing the inlet. However, when the fluid pressure applied to the check ball exceeds the resilient force applied to the check ball by the spring, the check ball is displaced or unseated from the inlet 84 in a rightward direction as viewed in FIG. 5, permitting fluid flowing through passageway 86 to flow through the hollow portion 78 of the end cap 78 and exhaust through the exhaust opening 79. The resilient force acting on the check ball is selected so that the check ball is unseated, and the clutch balance oil flowing through passageway 86 is exhausted, before the trim valve 74 has moved a sufficient distance in a leftward direction, as viewed in FIG. 5, to cut off the feed of clutch pressure. As discussed with respect to the embodiments illustrated by FIGS. 3 and 4 of the drawing, this arrangement permits the modified A or B Trim system to generate a clutch pressure exceeding that possible with the "factory installed" transmission, thereby achieving the same benefits as discussed with respect to the FIGS. 3 and 4 embodiments of the invention.

Other modifications to the Allison automotive transmission within the scope of the present invention, will be apparent to those skilled in the art. Therefore, the discussion of the preferred embodiments herein is intended to be illustrative only and not restrictive of the scope of the invention, that scope being defined by the following claims and all equivalents thereto.

What is claimed is:

1. A method of modifying the hydraulic circuitry of a factory installed Allison automotive transmission including a trim solenoid for applying fluid pressure to a trim valve, said trim valve coupled to a source of clutch fluid pressure for opposing the fluid pressure applied by said trim solenoid for moving said trim valve into a position in which it blocks said source of clutch fluid pressure for establishing a predetermined maximum clutch pressure for said factory installed transmission;

said method comprising the step of reducing the clutch fluid pressure applied to said trim valve for preventing said trim valve from moving into said position in which it blocks said source of clutch pressure, whereby said maximum clutch pressure is increased above that of said factory installed transmission.

2. The method as claimed in claim 1 wherein said step of reducing the clutch fluid pressure applied to said trim valve comprises the step of replacing said factory installed trim valve with an outer trim valve component and an inner trim valve component received within said outer trim valve component.

3. The method as claimed in claim 2 further including the step of defining a first opening in said outer valve component and a second opening in said inner valve component.

4. The method as claimed in claim 3 further including the steps of applying fluid pressure by said trim solenoid to said inner valve component to move said inner valve component in a first direction, and applying clutch fluid pressure to said outer valve component to move said outer valve component in a second direction opposite to said first direction, whereby said outer and inner valve components move relative to each other in opposite directions.

5. The method as claimed in claim 4 further including the steps of moving said inner valve component relative to said outer valve component so as to move said first opening in said outer valve component into alignment with said second opening in said inner valve component; and exhausting said clutch fluid pressure through said first and second openings, and through said inner valve component, to reduce the clutch fluid pressure applied to said outer valve component for preventing further movement of said outer valve component to block said source of clutch pressure.

6. The method as claimed in claim 5 further including the step of applying a resilient force to said inner valve component in a direction to oppose the fluid pressure applied to said inner valve component by said trim solenoid.

7. The method as claimed in claim 6 further including the step of adjusting the resilient force applied to said inner valve component to adjust the net force applied to said inner valve component for adjusting the movement of said inner valve component in said first direction relative to the movement of said outer valve component in said second opposed direction.

8. The method as claimed in claim 1 wherein the step of reducing the clutch fluid pressure applied to said trim valve comprises the step of defining a bore in said trim valve.

9. The method as claimed in claim 8 wherein said bore defined in said trim valve is in fluid communication with said source of clutch fluid pressure, said method comprising the further step of providing a blocking element to prevent flow of said clutch fluid through said bore in said trim valve when the pressure of said clutch fluid is below a predetermined value.

10. The method as claimed in claim 9 further including the step of displacing said blocking element to permit flow of clutch fluid through said bore in said trim valve when said clutch pressure meets or exceeds said predetermined value.

11. The method as claimed in claim 10 further including the step of exhausting said clutch fluid through said bore in said trim valve to reduce the clutch fluid pressure applied to said trim valve.

12. The method as claimed in claim 9 wherein said blocking element is a check ball.

13. The method as claimed in claim 12 further including the step of applying a resilient force on said check ball in a direction opposed to the clutch fluid pressure applied to said check ball.

14. The method as claimed in claim 13 further including the step of adjusting the resilient force applied to said check ball to adjust the predetermined value of said clutch pressure necessary to displace said check ball to permit flow of clutch fluid through said bore in said trim valve.

15. The method as claimed in claim 1 wherein said trim valve is a A trim valve, and said trim solenoid is a A trim solenoid.

16. The method as claimed in claim 1 wherein said trim valve is a B trim valve, and said trim solenoid is a B trim solenoid.

* * * * *